United States Patent
Breunig et al.

(10) Patent No.: US 8,578,293 B2
(45) Date of Patent: Nov. 5, 2013

(54) COOKING APPLIANCE HAVING AUTOMATIC COOKING PROGRAM PRESELECTION AND METHOD FOR SETTING SUCH A COOKING APPLIANCE

(75) Inventors: Manfred Breunig, Schongau (DE); Michael Greiner, Landsberg (DE)

(73) Assignee: LechMetall Landsberg GmbH Edelstahlerzeugnisse, Lansberg A. Lech ( * ) Notice: Subject to any disclaimer, the term of this patent is extended or adjusted under 35 U.S.C. 154(b) by 307 days.

(21) Appl. No.: 12/444,582

(22) PCT Filed: Oct. 4, 2007

(86) PCT No.: PCT/DE2007/001774
§ 371 (c)(1),
(2), (4) Date: Apr. 6, 2009

(87) PCT Pub. No.: WO2008/040334
PCT Pub. Date: Apr. 10, 2008

(65) Prior Publication Data
US 2010/0050119 A1    Feb. 25, 2010

(30) Foreign Application Priority Data
Oct. 6, 2006 (DE) .......................... 10 2006 047 813

(51) Int. Cl.
*F24C 7/08* (2006.01)
*G06F 9/445* (2006.01)

(52) U.S. Cl.
USPC ........................................................ 715/812

(58) Field of Classification Search
USPC .................................................. 715/812, 813
See application file for complete search history.

(56) References Cited

U.S. PATENT DOCUMENTS

| | | | | |
|---|---|---|---|---|
| 3,819,906 A | * | 6/1974 | Gould, Jr. | 219/506 |
| 5,111,028 A | * | 5/1992 | Lee | 219/506 |
| 5,808,278 A | | 9/1998 | Moon | |

(Continued)

FOREIGN PATENT DOCUMENTS

| | | |
|---|---|---|
| DE | 94 00 564.8 U1 | 4/1994 |
| DE | 100 24 368 A1 | 11/2001 |

(Continued)

OTHER PUBLICATIONS

International Preliminary Report on Patentability, issued Apr. 28, 2009, in corresponding International Application No. PCT/DE2007/001774, filed Oct. 4, 2007, 6 pages.

(Continued)

*Primary Examiner* — Omar Abdul-Ali
*Assistant Examiner* — Haimei Jiang
(74) *Attorney, Agent, or Firm* — Christensen O'Connor Johnson Kindness PLLC

(57) ABSTRACT

The present invention relates to a cooking appliance in which a large number of programs can be preselected as a function of at least one parameter. One parameter relates to the time of day and/or the date and/or the season at the site of installation of the cooking appliance. A large number of programs which are preselected by means of the parameters can be automatically displayed on a display device after the cooking appliance is switched on, and one of these displayed programs can be selected by means of at least one operator control device. The invention also relates to a method for setting a cooking appliance of this type.

28 Claims, 1 Drawing Sheet

(56) References Cited

U.S. PATENT DOCUMENTS

Figure 1:
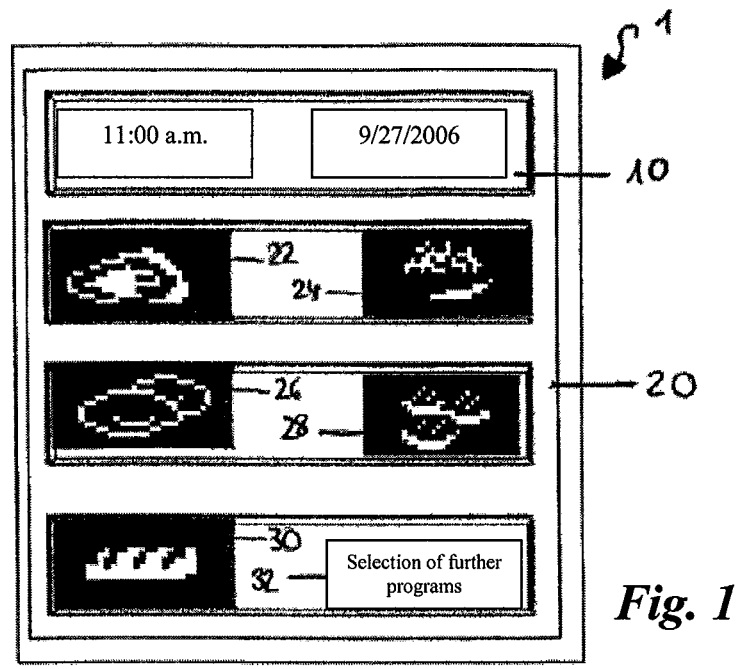

| | | |
|---|---|---|
| 5,832,446 A | 11/1998 | Neuhaus |
| 5,899,502 A | 5/1999 | Del Giorno |
| 6,236,974 B1 | 5/2001 | Kolawa |
| 6,678,685 B2 * | 1/2004 | McGill et al. .................. 725/34 |
| 7,292,146 B1 * | 11/2007 | Nguyen ..................... 340/572.1 |
| 8,335,796 B2 * | 12/2012 | Maeda et al. ................. 707/778 |
| 2003/0161922 A1 * | 8/2003 | Hillmann ...................... 426/523 |
| 2005/0091063 A1 | 4/2005 | Bergemann |
| 2006/0112833 A1 | 6/2006 | Blaschke |
| 2006/0178947 A1 * | 8/2006 | Zsigmond et al. ............. 705/26 |
| 2006/0236337 A1 * | 10/2006 | Zoller et al. .................... 725/37 |
| 2006/0278216 A1 * | 12/2006 | Gagas et al. ............. 126/299 D |
| 2007/0141540 A1 * | 6/2007 | Borg ............................ 434/127 |
| 2007/0158335 A1 * | 7/2007 | Mansbery .................... 219/505 |
| 2008/0028430 A1 * | 1/2008 | Kreiner et al. ................. 725/78 |
| 2008/0295702 A1 * | 12/2008 | Wiedemann et al. ........... 99/325 |

FOREIGN PATENT DOCUMENTS

| | | |
|---|---|---|
| DE | 101 17 292 A1 | 10/2002 |
| DE | 10 2004 013 553 A1 | 8/2005 |
| EP | 0 971 173 A1 | 1/2000 |
| EP | 1 758 000 A1 | 2/2007 |
| JP | 2005-195272 A | 7/2005 |

OTHER PUBLICATIONS

English Translation of European Opposition mailed Mar. 2, 2011, in European Patent No. 2 069 690, filed Oct. 4, 2007, 22 pages.

English Translation of European Response to Notice of Opposition submitted Aug. 10, 2011, in European Patent No. 2 069 690, filed Oct. 4, 2007, 9 pages.

* cited by examiner

COOKING APPLIANCE HAVING AUTOMATIC COOKING PROGRAM PRESELECTION AND METHOD FOR SETTING SUCH A COOKING APPLIANCE

The present invention relates to a cooking appliance in which a plurality of programs is pre-selectable in dependence on at least one parameter, at least one first parameter being determined by the time of day at the installation location of the cooking appliance, and/or at least one second parameter being determined by the day at the installation location of the cooking appliance, and/or at least one third parameter being determined by the season at the installation location of the cooking appliance, and a method for setting such a cooking appliance.

A cooking appliance is known from EP 0 971 173 A1, in which a country program list is displayed on a display, in each case in a country-specific order of control programs and/or control program descriptors. The country-specific different cooking and food customs may thus be taken into consideration. For example, the recipes may be placed in the order which reflects the average frequency of use for every national language and thus for each country in which the cooking appliance may be used. This means that, for example, the preparation of a pork roast occurs more frequently in Germany than in Turkey, and therefore the recipe for the pork roast appears at a significantly earlier point in the German country program list than in the corresponding Turkish list. The selection of the recipes by an operator is thus accelerated, because the first recipe of the country program list displayed at the start of the programming mechanism is the one most frequently used in this country. By further actuation of an input unit, with increasing duration, an operator reaches recipes of which the frequency of use is lower in the particular country. This does make the operability easier per se, but is not yet satisfactory for restaurant chains in particular.

An electronic control device for a domestic oven having a memory unit, in which cooking programs for a plurality of foods are stored, is known from EP 1 758 000 A1 (no prior publication). In dependence on the language or the region of the installation location of the oven, a selected partial set of the available cooking programs is provided for selection by a user according to the linguistic or region-specific conditions at the installation location.

A program-controlled domestic appliance having a stockpile of country-specific program sequences, which are stored in a memory of the device, is known from DE 101 17 292 A1. An assigned set of country-specific programs is provided for selection by the user through the selection of the display language of the appliance by a user.

U.S. Pat. No. 6,236,974 B1 discloses a computer-based system for domestic planning, which displays selected menu suggestions on the basis of information about personal preferences of the household members.

A cooking appliance according to the pre-amble of claim 1, having an electronic control unit and a read device is disclosed in DE 94 00 564 U1. Cooking programs may be stored in an internal memory of the cooking appliance. The subsequent recording of further cooking programs into the internal memory is made possible by a data carrier insertable into the read device and is thus meant to take seasonal variations into consideration, so that one and the same appliance may be used at Christmas time for producing gingerbread men and at Easter for producing Easter bunnies and the like, for example.

Furthermore, a domestic appliance controller is described in U.S. Pat. No. 5,808,278 A, which automatically deactivates those operating and display elements of a domestic appliance which do not correspond to Orthodox Jewish provisions on the Sabbath. Actually, this is to prevent an oven from being able to be used to cook food on the Sabbath.

The object of the present invention is therefore to refine the appliance according to the invention in such a way that it is operable rapidly, easily, and error-free, in particular for operating personnel of restaurant chains.

This object is achieved according to the invention in that, after the appliance is turned on, the plurality of the programs preselected via the first, second, and/or third parameters is automatically displayable on at least one display device, and one of these displayed programs is selectable via at least one operating device.

It may be provided that the programs are cooking programs and/or cleaning programs, and/or that the at least one first parameter is determined by the time of day at the installation location of the cooking appliance, and/or that the day at the installation location of the cooking appliance is selected from work day or holiday, and/or that the season is selected by the time of year and/or the weather.

It is also proposed by the invention that at least one fourth parameter be determined by the region of the installation location of the cooking appliance, and/or at least one fifth parameter be determined by the religion, in particular the geographic religion, of the customers to be served at the installation location of the cooking appliance, and/or at least one sixth parameter be determined by the language at the installation location of the cooking appliance.

The invention again provides that the plurality of programs is also selectable as a function of the fourth and/or fifth and/or sixth parameters.

According to the invention, it can be provided that the order and/or configuration of the programs on the display device may also be fixed by the average frequency of use, wherein the average frequency of use depends in particular on the first and/or second and/or third parameters, preferably the first and/or second and/or third and fourth and/or fifth and/or sixth parameters, and/or can be updated in operation of the cooking appliance.

Cooking appliances according to the invention may be further distinguished by a first area of the display device in which the preselected programs are displayed; and/or a second area of the display device in which the first and/or second and/or third parameters, preferably the first and/or second and/or third and fourth and/or fifth and/or sixth parameters is/are displayed; and/or a third area of the display device, in which at least one further program is displayed, which is preselectable, settable, and/or changeable by an operator.

Furthermore, it is proposed that one of the displayed programs be selectable via a first area of the operating device; and/or that the first and/or second and/or third parameters, preferably the first and/or second and/or third and fourth and/or fifth and/or sixth parameters be selectable and/or changeable via a second area of the operating device; and/or that one may change to another operating menu level via a third area of the operating device.

It is preferable according to the invention that the display device and operating device are at least partially comprised by a touch screen.

Further embodiments of a cooking appliance according to the invention are characterized by a timekeeper, such as a clock, and/or a positioning system, based on GPRS, for example, and/or at least one sensor, in particular for detecting the weather at the installation location of the cooking appliance, and/or a selection device for selecting the first, second, and/or third parameters, preferably the first and/or second and/or third and fourth and/or fifth and/or sixth parameters, each operationally linked to a regulator or control device.

It can be provided that the regulator or control device is operationally linked to the display device and/or the operating device.

Furthermore, cooking appliances according to the invention are proposed which are additionally characterized by at least one heating device for heating a cooking chamber, at least one device for introducing moisture into the cooking chamber, at least one device for exhausting moisture from the cooking chamber, at least one cooling device for cooling the cooking chamber, at least one cleaning device for cleaning the cooking chamber, and/or at least one sensor for detecting at least one characteristic variable in the cooking chamber, in particular operationally linked in each case to the regulator or control device.

At least one first memory device inside the cooking appliance and/or at least one second memory device outside the cooking appliance, in particular each able to be operationally linked to the regulator or control device, may be provided according to the invention.

Furthermore, it may be provided that the cooking appliance can be operationally linked to at least one personal computer, the Internet, a data carrier, for example, in the form of a USB flash drive, wherein the second memory device is preferably comprised by the personal computer and/or the data carrier.

A method for setting a cooking appliance according to the invention is also provided by the invention, which is characterized in that the preselected programs at the installation location are automatically preselected from stored programs, wherein the preselected programs can preferably be changed and/or supplemented manually, in particular after input of a specific first access code.

It can be provided that the first and/or second and/or third parameters, preferably the first and/or second and/or third and fourth and/or fifth and/or sixth parameters can be changed, in particular after input of a second access code, wherein the first and the second access codes are preferably selected as identical.

Finally, it is also proposed by the invention that the order and/or configuration of the preselected programs on a display device be determined by the frequency of use thereof, the frequency of use preferably being updated during the operation of the cooking appliance and/or fixed in dependence on values derived from experience, in particular in relation to the first, second and/or third parameters, preferably the first and/or second and/or third and fourth and/or fifth and/or sixth parameters.

The invention thus provides a reduction of the steps for selecting a program, namely in that, for example, cooking programs specially preselected by a restaurant chain automatically appear on a display device of a cooking appliance, sorted according to frequency of use, immediately after the cooking appliance is turned on, as a function of a time of day. By this linkage of, in particular, times of day and time spans stored in the cooking appliance, the cooking programs most frequently requested in these time spans by customers of said restaurant chain are thus automatically offered to operating personnel, for example, using pictogram symbols, on an uppermost operating level of the display device. For example, from 6:00 a.m. to 10:00 a.m. on work days, only a typical breakfast may be prepared using the cooking appliances according to the invention. The precise specifications of the times and time spans may be predefined by the restaurant chain, so that the customers receive their familiar foods independently of the operating personnel.

The cooking appliance according to the invention may be flexibly adapted to the particular wishes of the cooking appliance operator, in particular a restaurant chain, for example, by accommodating special foods of a season, a region, and the like in the preselected programs.

Figure 2:
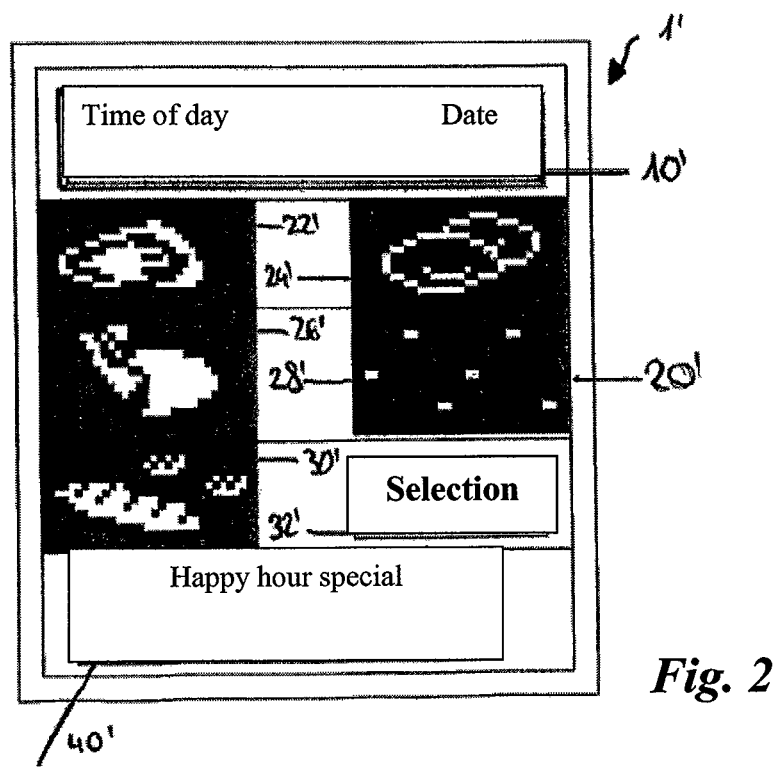

Further features and advantages of the invention result from the following description, in which two exemplary embodiments of the invention are explained on the basis of schematic drawings. In the figures:

FIG. 1 shows a touch screen of a first cooking appliance according to the invention having a first program preselection; and FIG. 2 shows a touch screen of a second cooking appliance according to the invention from FIG. 1 having a second program preselection.

A cooking appliance according to the invention comprises a touch screen 1, which simultaneously assumes the function of a display device and an operating device and is shown in FIG. 1. A touch screen 1 is activated by a control device (not shown) of the cooking appliance, in such a way that at specific times of day on specific days, specific cooking programs appear preselected on the touch screen 1. More precisely, the touch screen 1 comprises a time and date display 10, from which a first parameter in the form of a time of day, 11:00 a.m. here, and a second parameter in the form of a day, Sep. 27, 2006 here, may be inferred, and a product button panel 20. Immediately after the cooking appliance is turned on and the time of day and day are detected, six preselected cooking programs appear on the product button panel 20, namely in the area of six product buttons 22 through 32, here "large roasts" on the product button 22, "side dishes" on the product button 24, "fried egg" on the product button 26, "hamburgers" on the product button 28, "bread" on the product button 30, and a program which is still freely selectable by the particular operator of the cooking appliance on the product button 32.

In the touch screen 1' of FIG. 2, not only are a time and date display 10' for a time of day and a date and a product button field 20' provided, but rather also a display 40' of a name of a time span, "happy hour special" here. Not only are cooking programs selectable via the product button panel 20', namely "large roasts" via a product button 22', "fried egg" via a product button 24', "chicken" via a product button 26', "corn" via a product button 28', and "baguette" via a product button 30', but rather one may also change to a second operating menu level, in which further cooking programs are listed (not shown), sorted according to frequency of use, by actuating the product selection button 32'.

The features of the invention disclosed in the preceding description, in the drawings, and in the claims may be essential both individually and also in any arbitrary combination for implementing the invention in its various embodiments.

LIST OF REFERENCE NUMERALS 1, 1' touch screen
10, 10' time and date display
20, 20' product button panel
22 through 32 product button
22' through 30' product button
32' product selection button
40' display of a name of a time span

The invention claimed is:
1. A cooking appliance, comprising:
at least one display device; and
at least one operating device configured to receive a selected parameter that is selected by a user from a group of parameters comprising a first parameter, a second parameter, and a third parameter, wherein the at least one operating device automatically preselects, without user input, a plurality of cooking programs and/or cleaning programs in dependence on the selected parameter, each cooking program defining a cooking operation and each cleaning program defining a cleaning operation to be performed by the cooking appliance, wherein the plurality of cooking programs and/or cleaning programs that are preselected via the selected parameter are automatically displayed, without user input, on the at least one display device to a user after the cooking appliance is turned on, wherein one of these displayed programs is selectable by a user via the at least one operating device, wherein the first parameter is determined by the time of day at the installation location of the cooking appliance, the second parameter is determined by the day at the installation location of the cooking appliance, and the third parameter is determined by the season at the installation location of the cooking appliance, and wherein, in response to user selection of a displayed program, the cooking appliance is configured to perform the cooking operation or cleaning operation defined by the selected program.

2. The cooking appliance according to claim 1, wherein the group of parameters from which the selected parameter is selected further comprises a fourth parameter, a fifth parameter, and a sixth parameter, in which the fourth parameter is determined by the region of the installation location of the cooking appliance, the fifth parameter is determined by the religion of the customers to be served at the installation location of the cooking appliance, and the sixth parameter is determined by the language at the installation location of the cooking appliance.

3. The cooking appliance according to claim 2, wherein the plurality of programs can also be preselected in dependence on at least one of the fourth, fifth, and sixth parameters.

4. The cooking appliance according to claim 3, wherein an order or configuration of the programs on the display device is fixed by an average frequency of use, wherein the average frequency of use depends on at least one of the first, second, third, fourth, fifth, and sixth parameters.

5. The cooking appliance according to claim 3, further comprising:
a first area of the display device in which the preselected programs are displayed;
a second area of the display device in which at least one of the first, second, third, fourth, fifth, and sixth parameters are displayed; and
a third area of the display device in which at least one further program is displayed, which can be preselected, set, or changed by an operator.

6. The cooking appliance according to claim 5, wherein one of the displayed programs is selectable via the first area of the operating device; and
wherein at least one of the first, second, third, fourth, fifth, and sixth parameters is selectable or changeable via the second area of the operating device.

7. The cooking appliance according to claim 3, wherein the display device and the operating device are at least partially comprised by a touch screen.

8. The cooking appliance according to claim 1, further comprising:
a timekeeper;
a positioning system; and
a selection device for selecting at least one of the first, second, and third parameters, each operationally linked to a regulator or control device.

9. The cooking appliance according to claim 8, wherein the regulator or control device is operationally linked to the display device or the operating device.

10. The cooking appliance according to claim 8, further comprising:
at least one heating device for heating a cooking chamber, at least one device for introducing moisture into the cooking chamber, at least one device for exhausting moisture from the cooking chamber, at least one cooling device for cooling the cooking chamber, at least one cleaning device for cleaning the cooking chamber and at least one sensor for detecting at least one characteristic variable in the cooking chamber, operationally linked in each case to the regulator or control device.

11. The cooking appliance according to claim 8, further comprising at least one first memory device inside the cooking appliance and at least one second memory device outside the cooking appliance, wherein each memory device is operationally linked to the regulator or control device.

12. The cooking appliance according to claim 1, wherein the cooking appliance is operationally linked to at least one personal computer, the Internet, or a data carrier in the form of a USB flash drive.

13. A method for setting a cooking appliance including at least one display device and at least one operating device, the method comprising:
receiving a selected parameter that is selected by a user from a group of parameters comprising a first parameter, a second parameter, a third parameter, a fourth parameter, a fifth parameter, and a sixth parameter;
automatically preselecting a plurality of cooking programs and/or cleaning programs, by the operating device, from stored programs at an installation location of the cooking appliance, wherein the plurality of cooking programs and/or cleaning programs define cooking operations and/or cleaning operations, respectively, to be performed by the cooking appliance and are automatically preselected by the operating device, without user input, in dependence on the selected parameter,
wherein the first parameter is determined by the time of day at the installation location of the cooking appliance, the second parameter is determined by the day at the installation location of the cooking appliance, the third parameter is determined by the season at the installation location of the cooking appliance, the fourth parameter is determined by the region of the installation location of the cooking appliance, the fifth parameter is determined by the religion of the customers to be served at the installation location of the cooking appliance, and the sixth parameter is determined by the language at the installation location of the cooking appliance; and
automatically displaying, without user input, the plurality of cooking programs and/or cleaning programs preselected via the selected parameter on the at least one display device to a user after the cooking appliance is turned on,
wherein one of the displayed programs is selectable by a user via the at least one operating device, and
wherein the cooking appliance performs the cooking operation or cleaning operation defined by a selected displayed program in response to user selection of the program.

14. The method according to claim 13, further comprising changing at least one of the first, second, third, fourth, fifth, and sixth parameters.

15. The method according to claim 13, further comprising:
    determining a frequency of use of the preselected programs on the display device; and
    determining an order or configuration of the preselected programs for display on the display device based on the frequency of use thereof.

16. The method according to claim 15, further comprising updating the determination of frequency of use during operation of the cooking appliance.

17. The method according to claim 15, wherein the frequency of use is fixed in dependence on values derived from experience in relation to at least one of the first, second, and third parameters.

18. The cooking appliance according to claim 1, wherein the day at the installation location is selected from a workday or a holiday.

19. The cooking appliance according to claim 1, further comprising at least one sensor for detecting the weather at the installation location of the cooking appliance, wherein the season is selected by at least one of the time of year and the weather.

20. The cooking appliance according to claim 2, wherein the religion is a geographic religion.

21. The cooking appliance according to claim 4, wherein the order or configuration of the programs on the display device is updateable during operation of the cooking appliance.

22. The cooking appliance according to claim 6, wherein the third area of the operating device is configured to allow an operator to change the cooking device to another operating menu level.

23. The cooking appliance according to claim 11, wherein the second memory device is comprised by at least one of a personal computer and a data carrier.

24. The method according to claim 13, further comprising manually changing or supplementing the preselected programs after input of a first access code.

25. The method according to claim 14, wherein the parameter changing is enabled after the input of a second access code, wherein the first and the second access codes are selectable as identical.

26. The cooking appliance according to claim 1, wherein the selected parameter is maintained in the cooking appliance and is automatically retrieved by the operating device when the cooking appliance is turned on.

27. The method according to claim 13, further comprising:
    maintaining the selected parameter in the cooking appliance; and
    automatically retrieving, by the operating device, the selected parameter when the cooking appliance is turned on.

28. The cooking appliance according to claim 2, further comprising:
    a timekeeper;
    a positioning system; and
    a selection device for selecting at least one of the first, second, third, fourth, fifth, and sixth parameters, each operationally linked to a regulator or control device.

* * * * *

UNITED STATES PATENT AND TRADEMARK OFFICE
CERTIFICATE OF CORRECTION

| | |
|---|---|
| PATENT NO. | : 8,578,293 B2 |
| APPLICATION NO. | : 12/444582 |
| DATED | : November 5, 2013 |
| INVENTOR(S) | : M. Breunig et al. |

It is certified that error appears in the above-identified patent and that said Letters Patent is hereby corrected as shown below:

| COLUMN | LINE | |
|---|---|---|
| Title Page item (73) | Assignee | "Lansberg A. Lech" should read --Landsberg A. Lech-- |

Signed and Sealed this
Sixth Day of May, 2014

Michelle K. Lee
*Deputy Director of the United States Patent and Trademark Office*